United States Patent
Coon

[11] 3,731,477
[45] May 8, 1973

[54] HARVESTER FOR HEADED VEGETABLES

[76] Inventor: James G. Coon, 68 Madrid Plaza, Mesa, Ariz. 85201

[22] Filed: Jan. 24, 1972

[21] Appl. No.: 219,975

[52] U.S. Cl. .............................56/327 R, 56/DIG. 15
[51] Int. Cl. ..............................................A01d 45/26
[58] Field of Search ......................56/327 R, 327 A, 56/DIG. 15; 200/61.41, 61.42, 61.13, 61.14

[56] References Cited

UNITED STATES PATENTS

| | | | |
|---|---|---|---|
| 3,380,237 | 4/1968 | Garrett | 56/DIG. 15 |
| 3,412,540 | 11/1968 | Lawson | 56/327 A |
| 3,380,234 | 4/1968 | Garrett | 56/327 R |

Primary Examiner—Louis G. Mancene
Assistant Examiner—J. N. Eskovitz
Attorney—A. John Michel

[57] ABSTRACT

A high speed lettuce harvesting machine comprising a vehicle adapted to move along vegetable rows to be harvested, a pair of vegetable head-engaging sensing arms mounted on said vehicle, a plurality of sensor belts mounted on said arms, the sensor belts being adapted to be deflected by the circumference of said vegetable head to guide and actuate a cutting blade toward the stem of the vegetable head so as to sever only fully grown heads and to transport them to a conveyor.

6 Claims, 15 Drawing Figures

Patented May 8, 1973
3,731,477
5 Sheets-Sheet 1
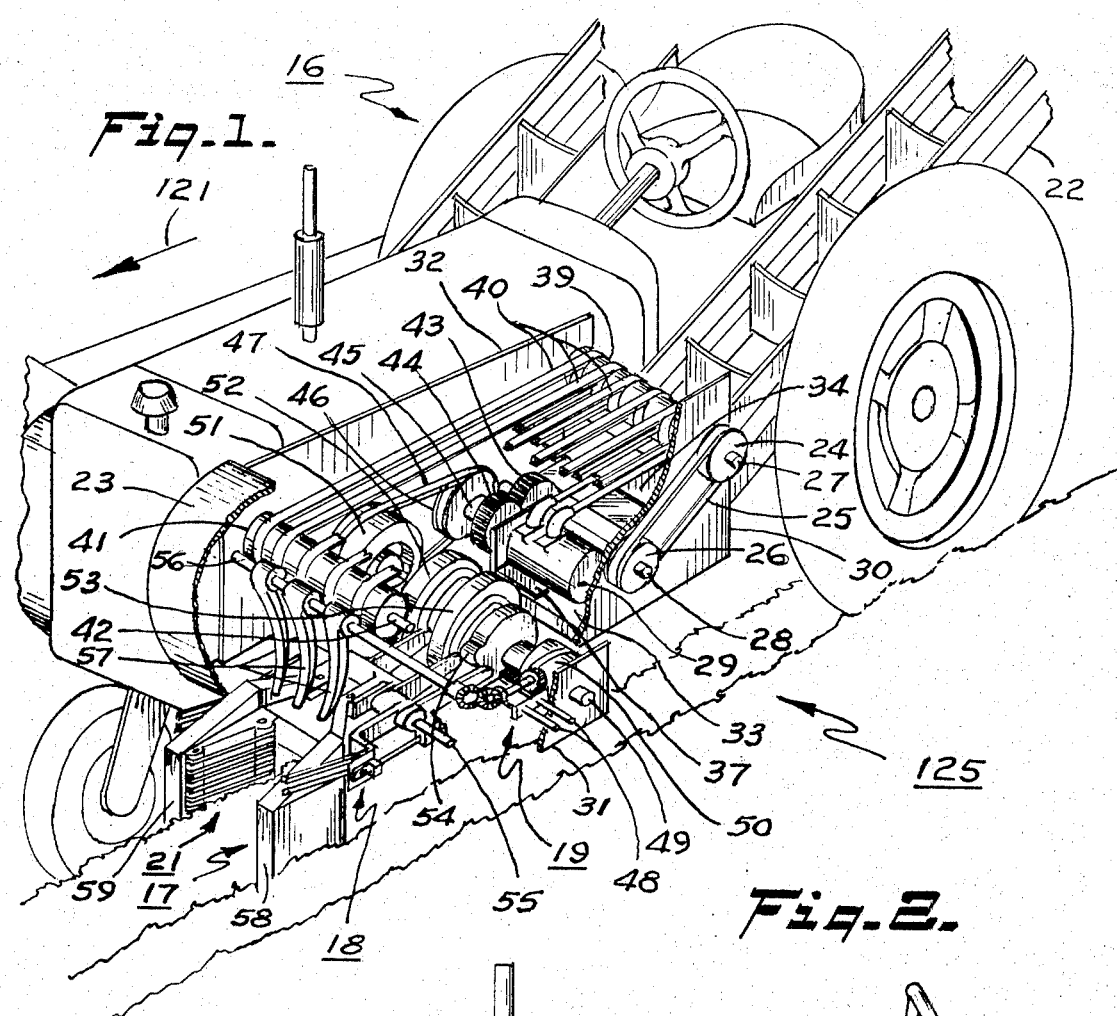
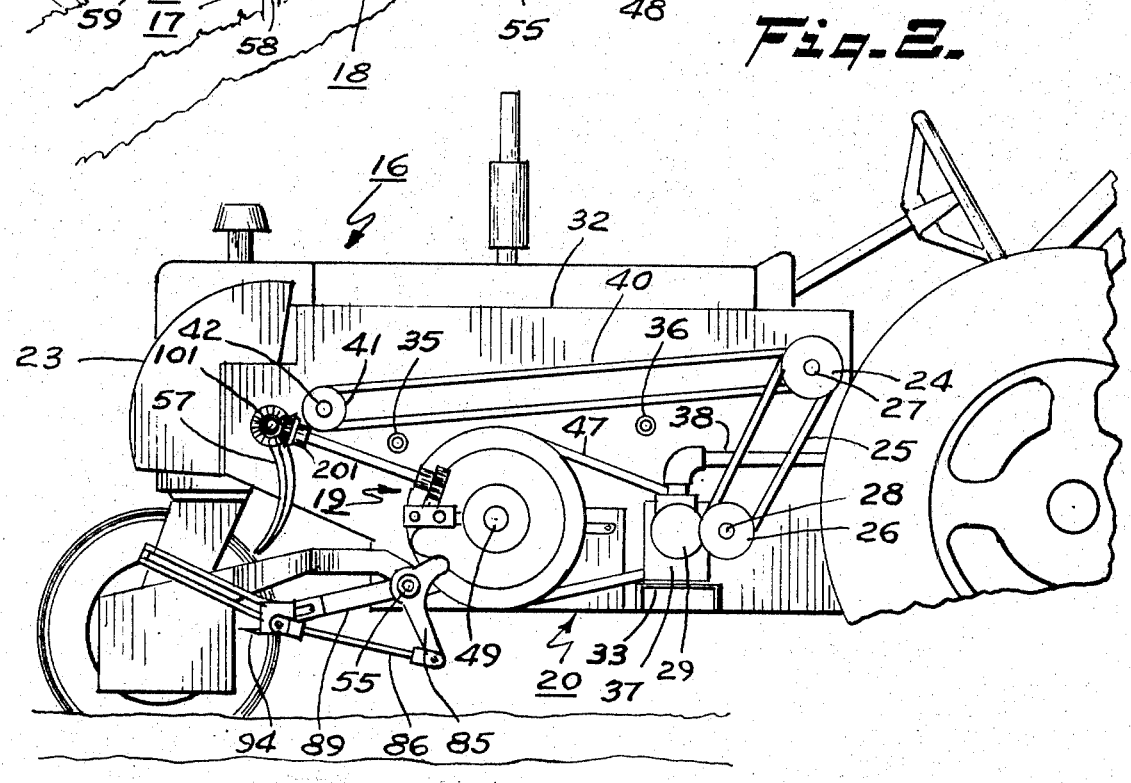

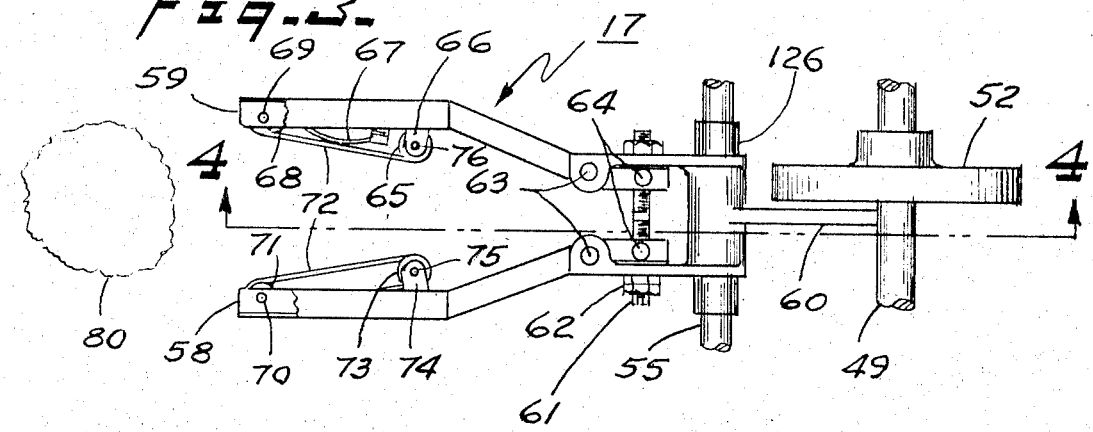
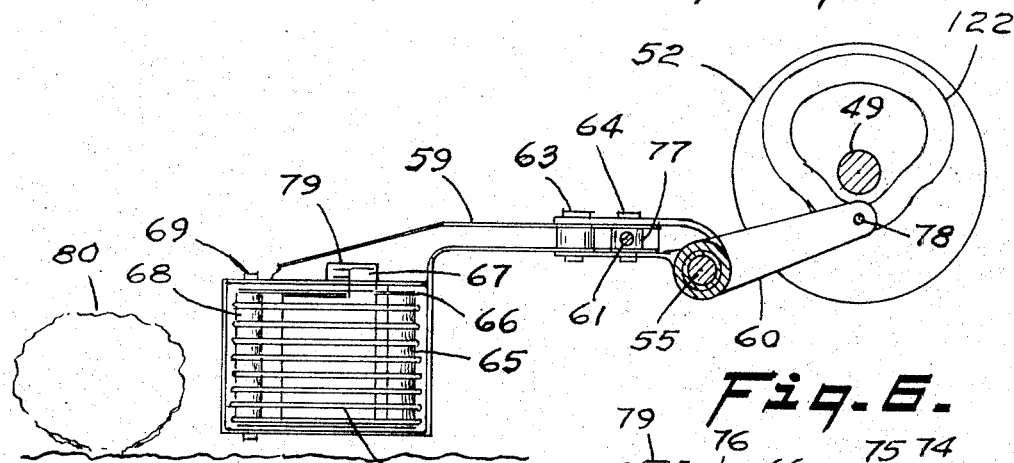
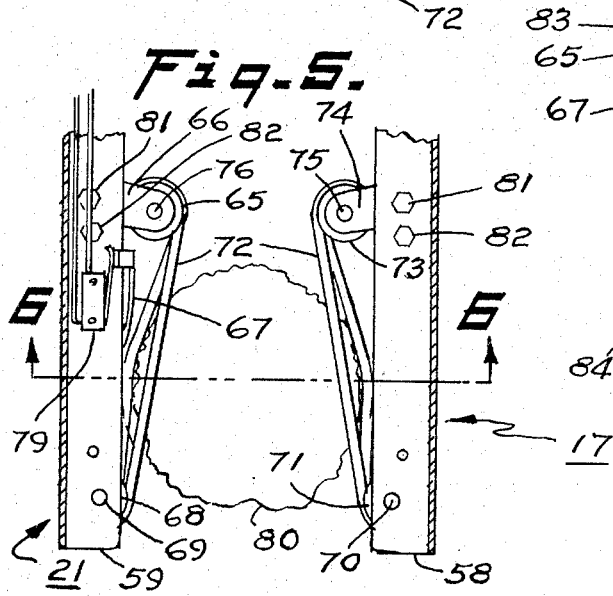
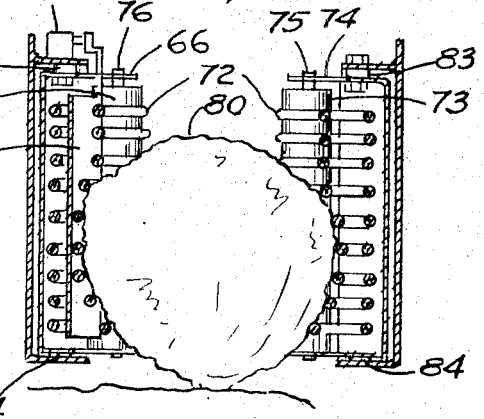

3,731,477

HARVESTER FOR HEADED VEGETABLES

This invention relates to a high-speed machine for the harvesting of head lettuce, and other headed vegetables, and more particularly to a sensing mechanism for properly selecting and cutting lettuce heads from a row or rows of lettuce in the fields.

It is an object of this invention to provide new and useful means for mechanically determining which heads of lettuce are of a suitable size and maturity to be harvested without disturbing the immature heads.

It is another object of this invention to provide an accurate cutting mechanism as a part of one cycle of operation of a lettuce harvesting machine, so that one complete cycle of the harvesting machine may be accomplished only by the effective sensing and selection as to the maturity, firmness and size of the lettuce heads to be harvested.

Another object of the invention is to provide a simple adjustment for the sensor arms for various size heads of lettuce to be harvested by the harvesting machine.

Another object of this invention is the provision of a mechanism in a lettuce harvesting machine for the translation of the severed heads of lettuce from the field row to a conveyor, and the returning of the mechanism automatically to its normal position for processing another head of lettuce before another cycle begins.

Another object of the invention is to provide a high-speed harvesting machine to facilitate the rapid harvesting of headed vegetables and to increase the efficiency of harvesting this product, said machine being mounted on the sides of a conventional tractor for harvesting the crop, and removed from the tractor after harvesting has been completed, thus freeing the tractor for other work.

Still another object of the invention is to provide a machine for harvesting headed vegetables with an apparatus suitable for operating a bent or curved cutting blade transverse to the rows of vegetables that are to be harvested, the curved part of the blade conforming to the topography of the sides of the row adjacent to eroded irrigation furrows, so that the cutting blade will sever the heads from a row growing at an angle or leaning toward the irrigation furrow due to the erosion of the sides of the row, thereby enabling the cutting of the plants at the base of the heads and without damaging the heads.

Another object of the invention is to provide a harvesting machine that can be operated without specially trained personnel, and which is rugged enough not to require an excessive amount of maintenance.

DRAWINGS

These and other objects and advantages of my invention will become more readily apparent from the following description and the accompanying drawings wherein:

FIG. 1 is a perspective view of one embodiment of my lettuce harvesting machine with the side frame-supporting plates and guard partially cut away for clarity, in which two harvesting machines are shown mounted on the sides of a conventional tractor;

FIG. 2 is a side elevational view of FIG. 1 with the side plates removed, showing the mechanisms and parts in a normal position as illustrated in FIG. 1;

FIG. 3 is a fragmentary plan view of the sensing belts, the sensor arms and their adjustment and actuating mechanism;

FIG. 4 is a sectional view taken substantially on line 4—4 of FIG. 3, showing the sensor belts, the sensor arms and cam means at their normal position;

FIG. 5 is a fragmentary top plan view of the sensing belts, the limit switch and its actuating plate, the sensor belt mounting and the tension brackets, showing a head of lettuce, of the desired size as it deflects the sensor belts and actuates the limit switch, the upper part of the arms being cut away for clarity;

FIG. 6 is a sectional view taken substantially on the line 6—6 of FIG. 5 showing the sensor belts deflected outward by the lettuce head, the belts acting as fingers holding the head of lettuce firmly, to be severed from its stem and then lifted by the arms from the row of lettuce being harvested;

DESCRIPTION OF PREFERRED EMBODIMENT

Figure 7:
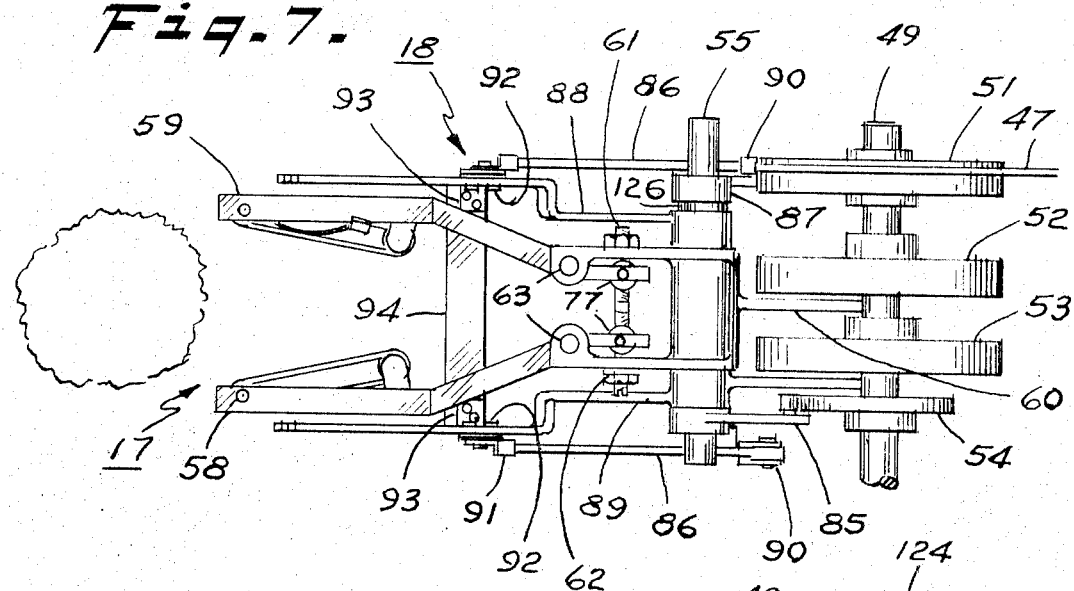
FIG. 7 is a top plan view of the cutting mechanism showing the cutting blade in its normal position, i.e. transverse to the rows of lettuce being harvested; this view also shows the cutting blade positioning arms, the sensor arms and the actuating mechanism.

Referring first to FIG. 1, two lettuce harvesting machines are shown mounted, one on each side of a conventional tractor 16, the machine on the far side being mostly obscured by the tractor. In this embodiment of the invention, the tractor 16 serves as the carrier for the harvesting machine to be described herein and which is indicated generally by reference numeral 125. It will be understood by those skilled in the art that various modifications may be resorted to in mounting the harvesting machine or machines.

For example, the harvester may be mounted on a completely self-contained unit or mounted as a trailed unit with or without a separate power source for its operation. If the carrier is a conventional tractor, the lettuce harvesting machines may be removed therefrom after harvesting and the tractor may be used for other purposes; subsequently, at harvesting time, the harvester may be replaced on the tractor.

The harvester 125 comprises substantially: vertical side support plates, i.e. inside plate 32, intermediate plate 30 and outside plate 31, which also provide bearing supports for a plurality of shafts as shown. The plates 30 and 32 are fastened together by a channel member 33 and a rear lower angle plate 34 (FIG. 1) and by spacer bars 35 and 36 (FIG. 2). The outside plate 31 is supported by and attached to plate 30 by spacer and support bars 102 and channel brackets 106 shown in FIG. 12. The vertical plates are attached together to form the frame or body of the lettuce harvesting machine. For reasons of clarity plates 30 and 31, (FIG. 1) have been cut away in order to show the various mechanisms in more detail.

Attached to the upper surface of the longitudinal channel member 33 (FIG. 1) is an L-shaped bracket 37 supporting a hydraulic motor 29 attached thereto and driving shaft 45 upon which is mounted and keyed a spur gear 44. Gear 44 meshes with spur gear 43 which is keyed to shaft 28 mounted in journal bearings on the frame of the machine. At the end of shaft 28 there is mounted a belt pulley 26 driving belt 25 and pulley 24 fixed to the end of shaft 27. Shaft 27 is mounted in journal bearings on the frame of the machine in the upper rear area of the body as shown in FIGS. 1 and 2. Keyed or otherwise secured to shaft 27 is an elongated grooved pulley 39, having assembled on it a plurality of endless belts 40 extending around another elongated grooved pulley 41 keyed to shaft 42. Shaft 42 is mounted in journal bearings on inner side plate 32 and intermediate plate 30 in the upperfront area of the machine body as shown in FIGS. 1 and 2. Shaft 28 drives pulley shaft 27 and pulley 39 by means of belts 40 of the conveyor 22. The conveyor 22 is positioned parallel with and above the rows of lettuce that the machine is gathering.

Keyed to the hydraulic drive shaft 45 is drive pulley 46 which drives belt 47 and flywheel 51 in counterclockwise direction, thus rotating the flywheel 51 which is mounted on the cam shaft 49 in journal bearings of the frame or body of the machine 125.

FIG. 2 shows the hydraulic line 38 that operates the motor 29 with the fluid from the hydraulic system of tractor 16.

Assembly 17 of FIG. 1 is shown in more detail in FIG. 3, in which each of the sensing arms 58, 59, carries a sensor belt assembly 21 at its forward end.

Sensing arms 58, 59 are attached by pivot pins 63 to rocker arm 60 mounted on shaft 55. Shaft 55 is supported in bearings on side supports 30 and 32 of the harvesting machine body. Also shown in FIGS. 3 and 4 are: cam 52 keyed to shaft 49; swivel nuts 64 assembled to sensing arms 58, 59 by means of adjusting screw 61 provided with right and left hand screw threads for moving or adjusting the arms 58, 59 inward or outward at the same time for different sizes of heads of lettuce to be harvested; nuts 62 which are provided for manually setting and locking the arms 58, 59 in the position desired according to the size of lettuce heads to be harvested by the machine.

FIG. 4 shows sensing arm 59 in a normal position with reference to the ground and head 80, also cam 52 with its cam track or groove 122 in its normal position with reference to cam follower roller 78 in rocker arm 60.

FIG. 5 (which is a fragmentary top plan view) shows arms 58, 59 with the upper section of the housing removed; a lettuce head 80 is being sensed for size by the sensor belts 72 around the elongated pulley systems 71 and 73 rotatable on vertical shafts 70 and 75 assembled in arm 58; the vertical shaft 75 and pulley 73 with belts 72 are assembled in the adjustable tension bracket 74 which is pivotable about bolts 81, 82 and movable radially for any desired increase or decrease of tension on belts 72, whereupon it may be locked by bolts 81 and 82 which position the belts 72 at an angle to the row of lettuce that is being harvested.

In the sensor section of arm 59 is assembled vertical shaft 69 cooperating with grooved pulley 68 carrying a series of sensor belts 72 in the front end of arm 59 with sensor belts 72 extending to and around grooved pulley 65 on shaft 76 in adjustable tension bracket 66 and assembled in the sensor section of arm 59 by upper and lower bolts 81 and 82 the tension bracket 66 being movable radially about bolts 82 for a desired tension on sensor belts 72 then tightened into position by bolts 81 and 82, positioning belts 72 at a desired angle to the lettuce heads to be harvested forming an angled entrance way for the lettuce heads to enter for sensing and severing. On upper plate of arm 59 there is mounted a normally open snap action switch 79 and vertically mounted switch actuator plate 67.

In FIG. 5, a head of lettuce 80 of sufficient size and firmness has entered the sensing belts 72, deflecting some of the belts 72 on each of the arms 58 and 59, moving the plate 67 to the switch arm and activating the switch 79 for a signal to energize the solenoid 108 (FIG. 13) to start the cycle of the machine 125 to sever the head of lettuce from its stem or stalk at this instant.

Figure 11:
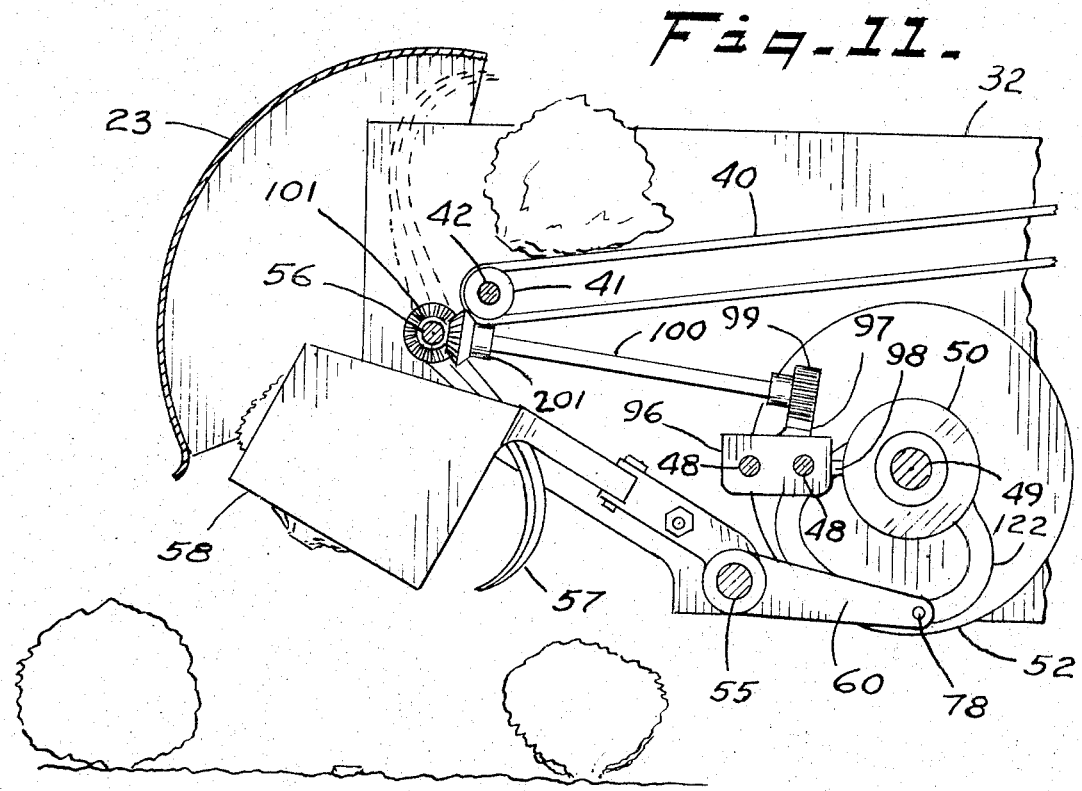
FIG. 11 is a fragmentary side elevation depicting the removal of a severed head of lettuce from the row of plants and then its removal from the sensor head by the recovery arms which place the heads on the conveyor; shown also is the actuating mechanism for the lifting of the sensing arms.

FIG. 6 (which is a sectional view substantially taken on line 6—6 of FIG. 5) shows the sensor belts 72 being deflected by the lettuce head 80. It is seen that the sensor belts 72 are acting as fingers around the lettuce head 80 while knife 94 (FIGS. 7,8) moves into position for cutting the lettuce head while the arms 58, 59 lift the head from the row of lettuce that is being harvested (FIG. 11).

FIG. 7 shows a top plan view of the cutting mechanism assembly 18 with the sensing and lifting arms 17 assembled on the rocker shaft 55. The flywheel 51 is shown mounted on the cam shaft 49 along with cams 52, 53 and 54 which are mounted as shown on shaft 49. Rocker shaft 55 carries sleeve 126, and on the central part of sleeve 126 is mounted the rocker arm 60; on each side of the rocker arm 60 on the sleeve 126 are mounted the cutting blade positioning arms 88 and 89 which are adapted to the rocker arm 60 in a fixed position and are free to rotate about sleeve 126, it being noted that the sleeve 126 with the arm 60 and the arms 88 and 89 are free to rotate around shaft 55.

Fixedly secured to the rocker arm shaft 55 on the outside of and adjacent to the cutting blade positioning arms 88 and 89 are crank arms 85 and 87 holding the sleeve 126 with the assembled arms 60, 88 and 89 in a lateral position on the shaft 55. Connected to crank arms 85 and 87 are two rod-end yokes 90 with push rods 86 respectively extending to and connected to the sliding brackets 93 that support the cutting blade 94; these brackets 93 have a pair of rollers 92 assembled on them and are movable in the slots of arms 88, 89. The rollers 92 impart a rolling action to the cutting blade when it is severing a head of lettuce at high speed. The cutting blade 94 is positioned at all times transversely to the rows of lettuce being harvested and is in the same position when the push rods 86 move the blade forward for the severing action. The mechanisms shown in FIG. 7 are at their normal position.

Figure 8:
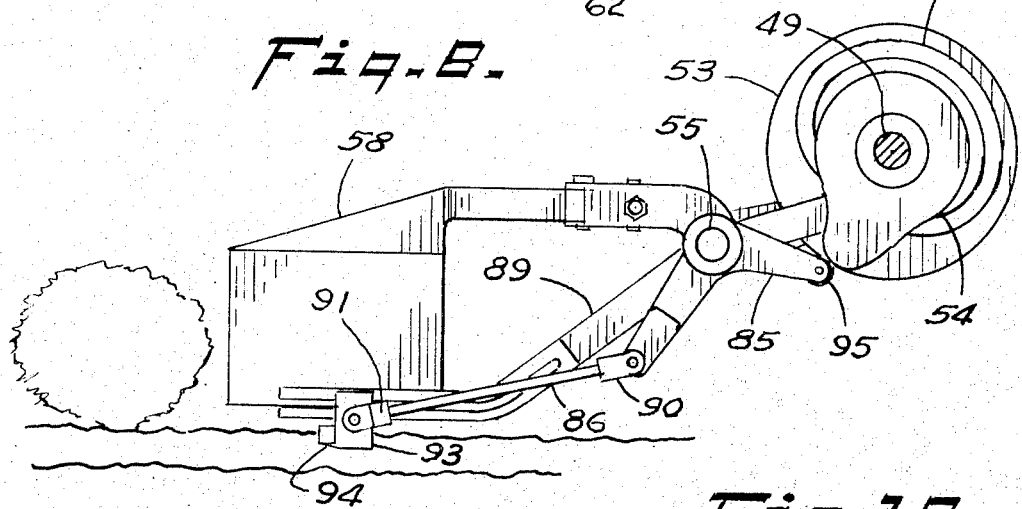
FIG. 8 is a fragmentary side elevation of the cutter-positioning arms in downward position with the cutting blade at its full stroke, the sensing arms being at their normal position for the head sensing operation.

FIG. 8 is a side elevational view of FIG. 7 showing that: cam 53 has rotated and has placed the blade-positioning arms 88 and 89 downward to the severing position, by the action of the cam follower roller 78 (FIG. 4) in the cam track 124; the profile cam 54 in contact with the follower roller 95 has pushed the arms 85 and 87 forward, along with push rods 86, brackets 93 and the cutting blade 94, i.e. forward along the row of lettuce at the ground level, the cutting blade 94 traveling underneath the sensing arms 58, 59, i.e. in readiness for the severing stroke of the blade 94 while the sensor belts 72 are holding the head of lettuce for severing.

Figures 9, 10:
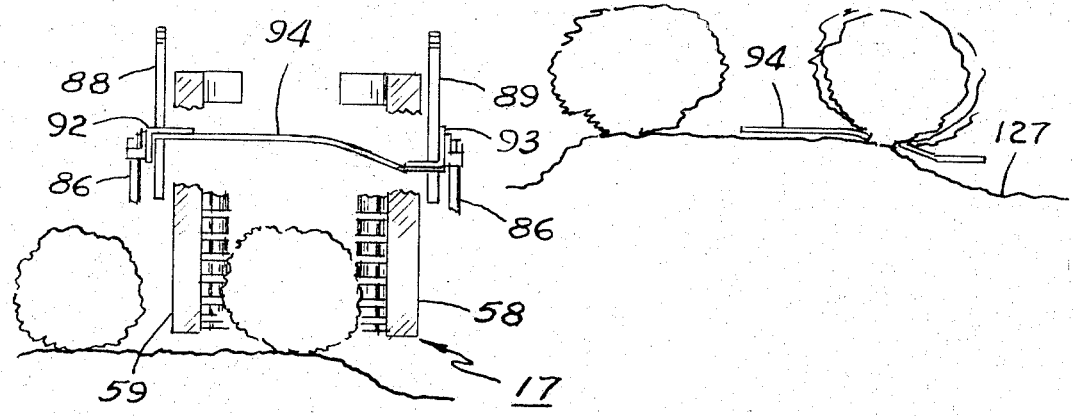
FIG. 9 is a fragmentary front elevational view of the sensor belts and sensing arms with the cutting blade and blade-positioning arms in their normal or inoperative position, looking toward the rear, showing a rejected head of lettuce that will pass between the sensor belts and under the cutting blade as the harvesting machine moves forward toward the observer along a row of headed vegetables.
FIG. 10 is a diagramatic view of the curved cutting blade in action and severing a lettuce head that has grown at an angle toward the irrigation furrow, caused by the erosion of the soil by water.

FIG. 9 is a fragmentary front elevational view, looking toward the rear of the harvesting machine with part of the sensor belts 72 cut away to show the curved and bent cutting blade 94 in its normal position supported by the arms 88 and 89 with a small head of immature lettuce in the passageway and passing undisturbed under the cutting blade 94 for further growth and harvesting at a later time.

FIG. 10 is a diagrammatic view of the curved or bent cutting blade 94 traversing the row of lettuce and depicting the severing of a head of lettuce that has grown in a leaning position i.e. by the erosion of the soil at its stem or root such as by the water in the irrigation furrow 127, and showing the severing of the head of lettuce at its base with no injury to the head despite its variation from the normal.

FIG. 11 is a fragmentary side elevational view depicting the translation of a sensed and severed head of lettuce lifted from the row of lettuce that is being harvested. The cam 52 has been rotated, shaft 49 moving arm 60 and cam follower roller 78 in cam track or groove 122, in a downward movement, thus raising the attached sensing arms 58 and 59, holding a severed head of lettuce for its disposition to the conveyor 40.

Figure 12:
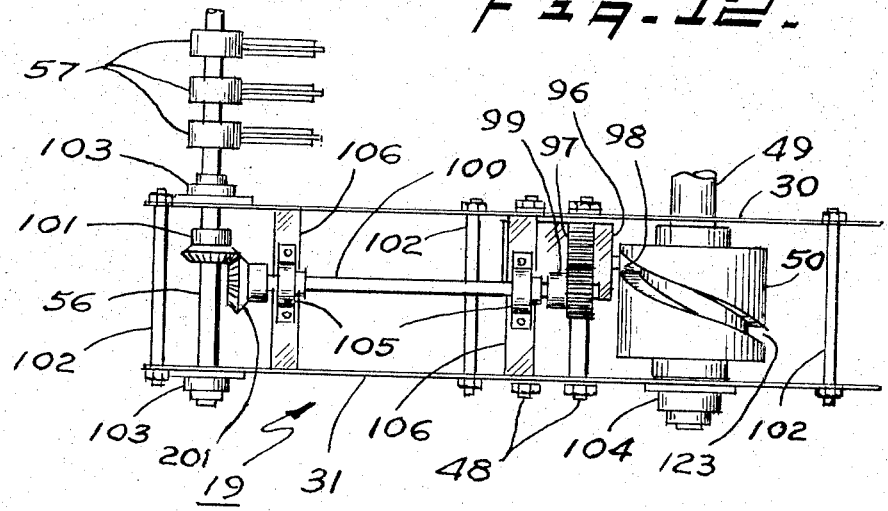
FIG. 12 is a fragmentary top plan view of the reciprocating mechanism and driving means for the recovery arms, and for the removing of the severed heads of lettuce from the sensing arms and belts.

FIG. 12 is a top plan view of the recovery mechanism for the removing of the head of lettuce from the raised sensing arms (only 58 being shown) and placing the heads on the conveyor belt 40 and thence to the storage container. The recovery arms 57 are rotated in the up position, the cylindrical cam 50, by its cam track 123 guiding the follower roller 98, and sliding bracket 96 on guide rods 48, toward the side plate 31 of the frame of the machine 125; the rack gear 97 on the upper surface of the bracket 96 drives the spur gear 99 keyed to shaft 100, mounted in bearings 105, on support brackets 106. On the opposite end of the shaft 100 there is provided a miter gear 201 meshing with miter gear 101 on shaft 56 which is supported by bearings 103 on the side plates 30 and 31 of the body of the machine 125, and extending transversely through the body of the machine; the recovery arms 57 are adjusted and fixed laterally on the shaft 56 for different sizes of heads of lettuce to be harvested. The recovery arms 57 are adapted to remove the head of lettuce from the sensing arms 58 and 59 (FIG. 11) by their rotation through 180 degrees forward and upwards, and thus place the heads on the conveyor belts 40. The driving mechanism assembly 19 is further driven by the cam 50, and rotating arms 57, back to its starting position for another cycle of the machine. Guard 23 is provided to keep the lettuce heads on the arms 57 when the heads are being removed from the sensing arms 58 and 59 and being placed on the conveyor.

Figure 13:
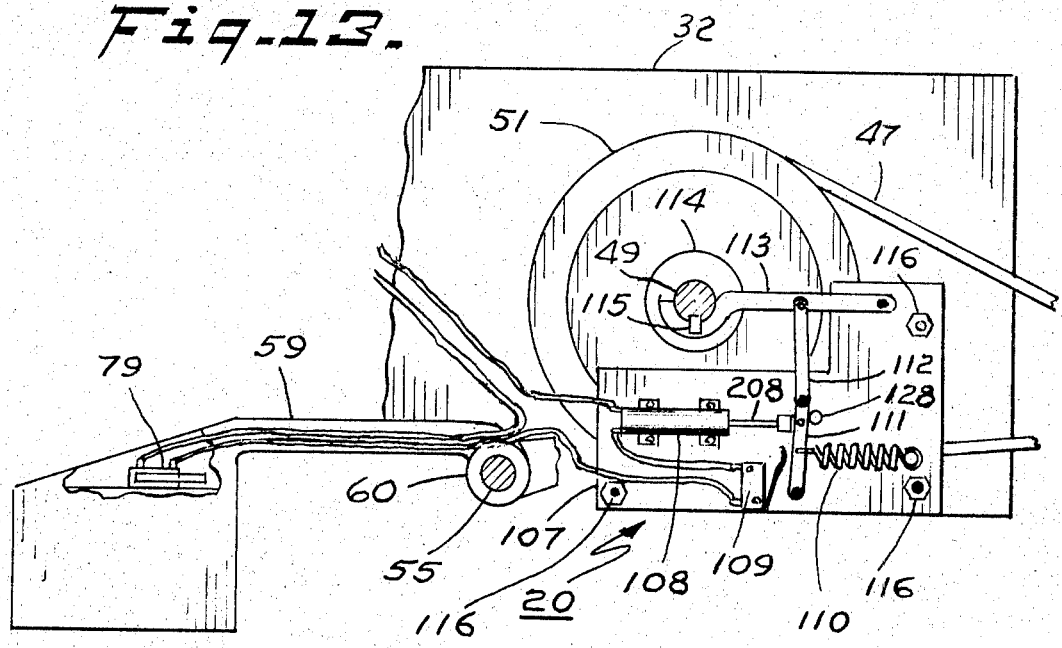
FIG. 13 is a fragmentary side elevation of the flywheel showing the clutching and declutching mechanism and the limiting switches that permit only one cycle of the harvesting machine at a time.

FIG. 13 is a fragmentary side elevational detail view of the assembly 20 illustrating the clutching and declutching mechanism 20 and showing the vertically mounted support plate 107, supported by spacer bars 116, attached to the side body plate 32, the releasing and resetting arm 113 which is pivoted and attached to the plate 107. About midway between the shaft 49 and the pivot point of arm 113 are connected two arms 112; the lower ends of arms 112 are pinned to the upper end of arm 111, forming a hinged joint between them. The lower end of arm 111 is pivoted onto plate 107, thus forming a yoke type lever. On the lower side of plate 107 there is mounted a normally closed limit snap-action switch 109 adjustable with respect to arm 111; on the opposite side of arm 111 there is mounted a tension spring 110. Close to the hinge point of arm 111 there is provided the plunger rod 208 of solenoid 108, the body of the solenoid 108 being assembled to the support plate 107. The normally open-limit switch 79 is mounted on the sensing arm 59. When switch 79 is activated, current will flow through the normally closed limit switch 109 to energize the solenoid 108, causing its plunger 208 to pull the yoke arms 111 and 112 toward it and thus moving arm 113 downward from the cam shaft 49 by a small but sufficient distance to release the spring-loaded key 115; at this instant, the arm 111 activates the limit switch 109, breaking the current flow to the solenoid 108 and deenergizes it. The tension spring 110 immediately pulls back the arms 111 and 112, and thus restores the arm 113 to its normal position. As the end of one revolution approaches, the spring-loaded key 115, being engaged in the key slots of the flywheel 51, is pulled from the key slots in the flywheel by the sharp pointed cam section of the arm 113, thus resetting the key 115 for another cycle of the machine.

Figure 14:
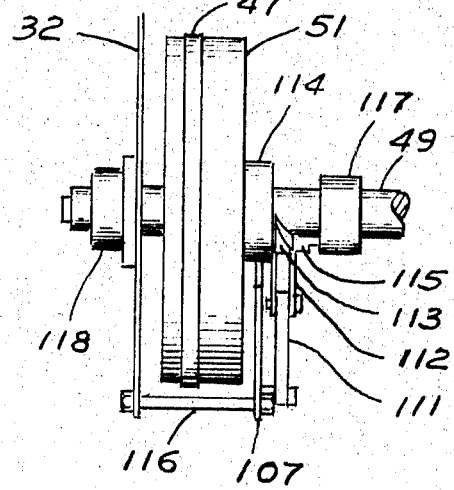
FIG. 14 is a fragmentary front elevation of the flywheel showing the cam side of the releasing and resetting arm for driving the cam shaft and the harvesting machine intermittently during one cycle or revolution, each time a head of lettuce is to be harvested by the machine.

FIG. 14 is a fragmentary front elevation of the flywheel 51, looking towards the rear. As may be seen from this view, the end of the arm 113, with its tapered side cam of arm 113 and the key 115 in the key slot of the cam shaft 49, rests on the side of the release arm 113, and is ready to be released by the sequence of operations resulting from the arms 58 and 59 sensing another mature head of lettuce to be harvested as described above.

Figure 15:
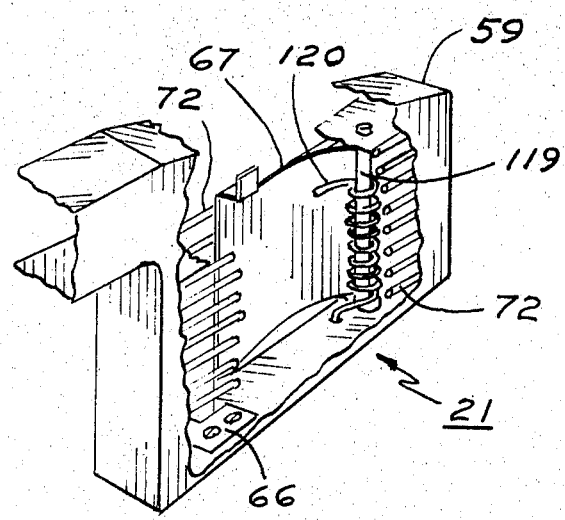
FIG. 15 is a fragmentary perspective view taken somewhat from the rear looking toward the front of the sensor arm and belts, showing the switch-actuating plate mounted between the sensor belts and their pulleys and showing a coil spring urging the plate to the inner sides of the sensor belts on the sensing side of the arm.

FIG. 15 is a fragmentary perspective view of assembly 21, looking somewhat from the rear toward the front end of the sensing arm 59, and showing the switch-activating plate 67, the vertical shaft 119, the coil spring 120, assembled in the arm 59, the sensor belts 72, the upper end of spring 120 holding the plate 67 against the inside of the belts 72 on their sensing side until a full-grown head of lettuce deflects the belts 72 to make the plate 67 activate the switch 79 (FIG. 13).

OPERATION

The operation of this invention is substantially as follows: Assuming that the sensing mechanism assembly 17 with sensing arms 58, 59, is in the appropriate position for harvesting and that the vehicle moves forward in the direction of the arrow 121 (FIG. 1) along the row or rows of lettuce to be harvested, with the flywheel on shaft 49 being rotated by the hydraulic motor 29; (the hydraulic power being supplied by the hydraulic system of tractor 17). The conveyor belts 40 are also driven by the hydraulic motor 29, the driving mechanism of conveyor 22 is driven by the power take-off shaft of the tractor 16.

Also assume that the sensing arms 58, 59 are pre-adjusted by the adjusting screw 61, and locked in position by nuts 62, for a particular size head of lettuce to be harvested. As the machine moves forward and the arms 58 and 59 contact a head of lettuce in the passageway, the sensor belts 72 being free to rotate with their pulleys on their shafts: if the head of lettuce being sensed is of sufficient size and firmness it not only contacts the belts 72, but it deflects the belts 72 enough to move the switch plate 67, thus activating the switch 79 which is normally open. The switch being now closed by plate 67, solenoid 108 is energized, releasing the clutch key 115, and clutching the shaft 49, and the flywheel 51, which rotates the shaft 49, with the cams 50, 52, 53 and 54. Said cams are fixed to the cam shaft 49, for their sequence in operating the mechanisms during one revolution of the shaft 49, completing a cycle of the machine. At the start of the revolution of the shaft 49, cam 53 lowers arms 88, 89 into the position shown in FIG. 8, thereupon the cam 54 actuates the cutting mechanism, driving the cutting blade 94 forward and under the sensing arms 58, 59, severing the head of lettuce from its stalk while the sensed head is being held in the sensor belts 72. Next, cam 52 actuates the arms 58, 59 to their upper position for removing the severed head of lettuce from the row of lettuce that is being harvested. In the meantime, cams 53 and 54 have moved the cutting mechanism back to its normal position (FIG. 2); next, cam 50 actuates the drive mechanism (FIG. 12) moving the arms 57 forward between the sensor belts 72, removing the lettuce head from the sensor arms 58, 59, and placing the heads of lettuce on the conveyor belts 40, whence they are conveyed to the packing container. In the meantime cam 52 has moved the arms 58, 59 back to their normal position and at the same time cam 50 has returned the arms 57 back to their starting position; the key 115 is extracted from the flywheel key slots by the arm 113, and the clutch key 115 is reset for another cycle of the harvesting machine. The complete cycle of the machine has been completed within one revolution of the cam shaft 49; the cycling operation of the machine being very fast, the flywheel 51, revolving constantly, is possessed of sufficient momentum to maintain the continuous rotary velocity of cam shaft 49 which is coupled thereto.

It will be understood that various changes may be made in the form, details, arrangements, proportions and number of the parts described above without departing from the spirit and scope of my invention as set forth in the appended claims.

What is claimed is:

1. A high speed machine for harvesting headed vegetables, comprising;

a vehicle adapted to be guided along vegetable rows to be harvested;

a pair of vegetable head-engaging sensing arms mounted upon said vehicle;

said sensing arms being provided with horizontal adjustment means for various sizes of vegetable heads, and with means for rigidly locking said sensor arms into a horizontal position for a particular size of vegetable head to be harvested;

said sensing arms being further provided with a plurality of rotatable belts, attached to, and in an angular position on, the inner vertical sides of the adjustable sensing arms;

said sensing arms comprising means for exerting a predetermined tension on said rotatable belts;

said belts being rotated and deflected around the sides of the vegetable head as said head moves into the sensing arms in conformity with the size and firmness of the head being sensed;

cutting means provided for the severing of the mature heads sensed by said sensing arms while being held in a rigid position by said arms;

said sensing arms comprising means for lifting the severed heads from the rows and for the removal of the severed heads from said sensing arms.

2. Harvester as claimed in claim 1 in which said cutting means comprises a partially curved cutting blade positioned transverse to the row of heads of vegetable to be harvested, and means for positioning said blade transverse to the heads and for severing said heads at their base.

3. Harvester as claimed in claim 1 comprising means for providing angular and tension adjustments on said plurality of rotatable belts said means being attached, on vertical pulleys, to the inner surfaces of the adjustable sensing arms to provide bracket adjustments on said belts for providing an angular fixed space between the sensing arms for the entrance of the head of lettuce to be sensed for severing or rejection.

4. Harvester as claimed in claim 1 comprising an angular space defined by said rotatable belts between said sensing arms, the rotatable belts being rotated by the size and firmness of the heads of lettuce entering the larger opening of said space, said heads contacting said belts and rotating said belts as they move toward the smaller space.

5. Harvester as claimed in claim 4 comprising angularly spaced means between the sensing arms which, during the forward movement of the machine, force the mature heads into such angular space between the sensing arms, thus deflecting the belts adjacent to the sides of the mature heads for the sensing action, and severing the heads while being held in a rigid position.

6. Harvester as claimed in claim 3 comprising means for automatically transmitting an electrical impulse to an electromagnet for the severing of a head which is of sufficient firmness and size so as to deflect the prestressed belts of said sensing arms, and means for radially lifting the severed heads from the vegetable rows to a position above the rows while being held firmly, for their removal.

* * * * *